United States Patent
Yang

(10) Patent No.: US 10,549,240 B2
(45) Date of Patent: Feb. 4, 2020

(54) WATER FILTRATION SYSTEM

(71) Applicants: FOSHAN SHUNDE MIDEA WATER DISPENSER MFG. CO., LTD, Foshan (CN); MIDEA GROUP CO., LTD., Foshan (CN)

(72) Inventor: Lyu Yang, Foshan (CN)

(73) Assignees: FOSHAN SHUNDE MIDEA WATER DISPENSER MFG. CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 0 days.

(21) Appl. No.: 15/863,696

(22) Filed: Jan. 5, 2018

(65) Prior Publication Data

US 2018/0257037 A1    Sep. 13, 2018

Related U.S. Application Data

(63) Continuation of application No. PCT/CN2017/087310, filed on Jun. 6, 2017.

(30) Foreign Application Priority Data

Mar. 7, 2017    (CN) .......................... 2017 1 0132570
Mar. 7, 2017    (CN) ..................... 2017 2 0219976 U

(51) Int. Cl.
*B01D 61/12*    (2006.01)
*B01D 61/04*    (2006.01)
(Continued)

(52) U.S. Cl.
CPC ............ *B01D 61/12* (2013.01); *B01D 61/04* (2013.01); *C02F 1/001* (2013.01); *C02F 1/008* (2013.01);
(Continued)

(58) Field of Classification Search
CPC ............ B01D 2311/02; B01D 2311/25; B01D 2311/2649; B01D 2313/18;
(Continued)

(56) References Cited

U.S. PATENT DOCUMENTS 4,623,467 A * 11/1986 Hamlin .................. B01D 61/08
                                                              210/257.2
9,422,173 B1    8/2016 Spiegel et al.
2016/0361673 A1* 12/2016 Cai ........................... C02F 1/44

FOREIGN PATENT DOCUMENTS

CN         105036400 A     11/2015
CN         205516831 U     8/2016
(Continued)

OTHER PUBLICATIONS

Foshan Shunde Midea Water Dispenser Mfg. Co. Ltd. et al., Extended European Search Report, EP17749105.7, dated Feb. 28, 2018, 7 pgs.
(Continued)

*Primary Examiner* — Terry K Cecil
(74) *Attorney, Agent, or Firm* — Morgan, Lewis & Bockius LLP

(57) ABSTRACT

A water filtration system (100) includes a filter cartridge assembly (10), a water-inlet conduit (20), a purified-water conduit (30), a pure-water conduit (40) and a waste-discharge conduit (50). The filter cartridge assembly (10) has a water inlet (110), a purified-water outlet (120) and a purified-water outlet (140). The water-inlet conduit (20) is in communication with the water inlet (110). The pure-water conduit (40) is in communication with the pure-water outlet (140). The purified-water conduit (30) is in communication with the purified-water outlet (120) and has a first valve body (320) configured to control on and off of the purified-
(Continued)

water conduit (30). The waste-discharge conduit (50) is in communication with the purified-water conduit (30).

8 Claims, 2 Drawing Sheets

(51) Int. Cl.
*C02F 1/00* (2006.01)
*C02F 1/44* (2006.01)
*B01D 61/02* (2006.01)

(52) U.S. Cl.
CPC ............ *C02F 1/441* (2013.01); *B01D 61/025* (2013.01); *B01D 61/027* (2013.01); *B01D 2311/02* (2013.01); *B01D 2311/25* (2013.01); *B01D 2311/2649* (2013.01); *B01D 2313/18* (2013.01); *B01D 2313/243* (2013.01); *C02F 1/442* (2013.01); *C02F 2201/006* (2013.01); *C02F 2301/046* (2013.01)

(58) Field of Classification Search
CPC ............ B01D 2313/243; B01D 61/025; B01D 61/027; B01D 61/04; B01D 61/08; B01D 61/12; C02F 1/001; C02F 1/003; C02F 1/008; C02F 1/441; C02F 1/442; C02F 2201/004; C02F 2209/03; C02F 2301/046; C02F 2303/04; C02F 2201/006
See application file for complete search history.

(56) References Cited

FOREIGN PATENT DOCUMENTS

| | | |
|---|---|---|
| CN | 205635100 U | 10/2016 |
| KR | 10-0153587 B1 | 10/1998 |
| KR | 10-0947761 B1 | 3/2010 |

OTHER PUBLICATIONS

Notification of Reason for Refusal, KR1020177023872, dated Nov. 21, 2018, 14 pgs.
Notice of Final Rejection, KR1020177023872, dated Jul. 22, 2019, 8 pgs.

* cited by examiner

WATER FILTRATION SYSTEM

PRIORITY CLAIM AND RELATED APPLICATION

This application is a continuation application of PCT/CN2017/087310, entitled "WATER FILTRATION SYSTEM" filed on Jun. 6, 2017, which claims priority to Chinese Patent Application No. 201720219976.7, filed with the State Intellectual Property Office of the People's Republic of China on Mar. 7, 2017, and entitled "WATER FILTRATION SYSTEM", and Chinese Patent Application No. 201710132570.X, filed with the State Intellectual Property Office of the People's Republic of China on Mar. 7, 2017, and entitled "WATER FILTRATION SYSTEM", all of which are incorporated herein by reference in their entirety.

TECHNICAL FIELD

The present disclosure relates to a technical field of household appliances, and more particularly to a water filtration system.

BACKGROUND

In the related art, a water filtration system only adopts a one-stage filter membrane to filter water, and the water cannot be treated through fine filtration, resulting in unsatisfactory filtration effects, and the water will affect people's health in case of directly drinking. In a water filtration system adopting a multi-stage filter cartridge of the related art, there are disadvantages of a complex conduits, many ports and large volume. In addition, in a process of treating and producing pure water by the multi-stage filter cartridge, waste water is generated, such that a waste water port and a waste water conduit may be disposed separately, making the conduit structure more complex.

SUMMARY

Embodiments of the present disclosure seek to solve at least one of the problems existing in the related art to at least some extent. Accordingly, a water filtration system is provided by the present disclosure, and has advantages of compact structure and easy to use.

The water filtration system according to embodiments of the present disclosure includes a filter cartridge assembly having a water inlet, a purified-water outlet and a pure-water outlet; a water-inlet conduit communicated with the water inlet and provided with a water-inlet control valve; a pure-water conduit in communication with the pure-water outlet; a purified-water conduit communicated with the purified-water outlet and having a first valve body configured to control on and off of the purified-water conduit; and a waste-discharge conduit communicated with the purified-water conduit and having a first end located between the first valve body and the purified-water outlet; in which when the water filtration system prepares the purified water, the purified-water conduit is communicated, and when the water filtration system prepares the pure water, the pure-water conduit and the waste-discharge conduit are communicated and the first valve body is closed.

For the water filtration system according to embodiments of the present disclosure, by disposing the filter cartridge assembly, a structure of the water filtration system may be made compact and a conduit layout may be optimized. Moreover, the purified-water conduit and the pure-water conduit are separately disposed in the water filtration system, such that outlets outputting water of different qualities may be selected according to different water requirements in lives, the operation is easy, waste may be reduced, energy is saved and consumption is reduced. In addition, the waste-discharge conduit is in communication with the purified-water conduit, thus making the waste-discharge conduit and the purified-water conduit share the purified-water outlet, thereby reducing ports of the water filtration system, further optimizing the conduit layout.

According to some embodiments of the present disclosure, the water filtration system may further include: a pump body assembly configured to drive the water in the water-inlet conduit to flow and provided on the water-inlet conduit; and a second valve body located on the pure-water conduit. Thus, it may increase the water pressure by the pump body assembly and control on and off of the pure-water conduit by the second valve body.

According to some embodiments of the present disclosure, the pump body assembly is located between the water-inlet control valve and the water inlet. Thus, water communication in the water filtration system may be controlled promptly by the water-inlet control valve.

According to some embodiments of the present disclosure, the pump body assembly is configured as a booster pump and the second valve body is configured as a check valve. Thus, pressure of the water may be increased by the booster pump. By the second valve body configured as the check valve, the water in the pure-water conduit may flow in one-way direction.

According to some embodiments of the present disclosure, the water-inlet control valve is configured as a solenoid valve. Thus, sensitivity and accuracy of control of the water-inlet control valve may be improved.

According to some embodiments of the present disclosure, the water filtration system also includes a pre-filter mesh provided on the water-inlet conduit and located at the upstream of the water-inlet control valve. Thus, a large-grain impurity in the water may be filtered out by the pre-filter mesh, preventing the large-grain impurity from entering the water-inlet control valve and the pump body assembly to cause damage of the water-inlet control valve and the pump body assembly.

According to some embodiments of the present disclosure, the waste-discharge conduit is provided with a third valve body configured to control on and off of the waste-discharge conduit. Thus, on and off of the waste-discharge conduit may be controlled by the third valve body.

According to some embodiments of the present disclosure, the third valve body is configured as a solenoid valve. Thus, flexibility and accuracy of control of the third valve body may be improved.

According to some embodiments of the present disclosure, the filter cartridge assembly includes a pre-filter cartridge located between the water inlet and the purified-water outlet; a fine filter cartridge located between the pure-water outlet and the purified-water outlet; and a post-filter cartridge disposed to the pure-water outlet. Thus, on one hand a multi-stage filter cartridge may be integrated within the filter cartridge assembly, so as to make an overall structure of the water filtration system compact; on the other hand, filtering effects of the water filtration system may be improved, and water quality of the filtered water may be improved.

According to some embodiments of the present disclosure, the fine filter cartridge is a reverse-osmosis filter cartridge or a nanofiltration-membrane filter cartridge. Thus, adopting the reverse-osmosis membrane may effectively filter out impurities, bacterium and viruses in the water and adopting the nanofiltration-membrane filter cartridge may reduce requirements for water pressure in the fine filtration process in the water filtration system, thereby saving the energy consumption.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

REFERENCE NUMERALS

Figure 1:
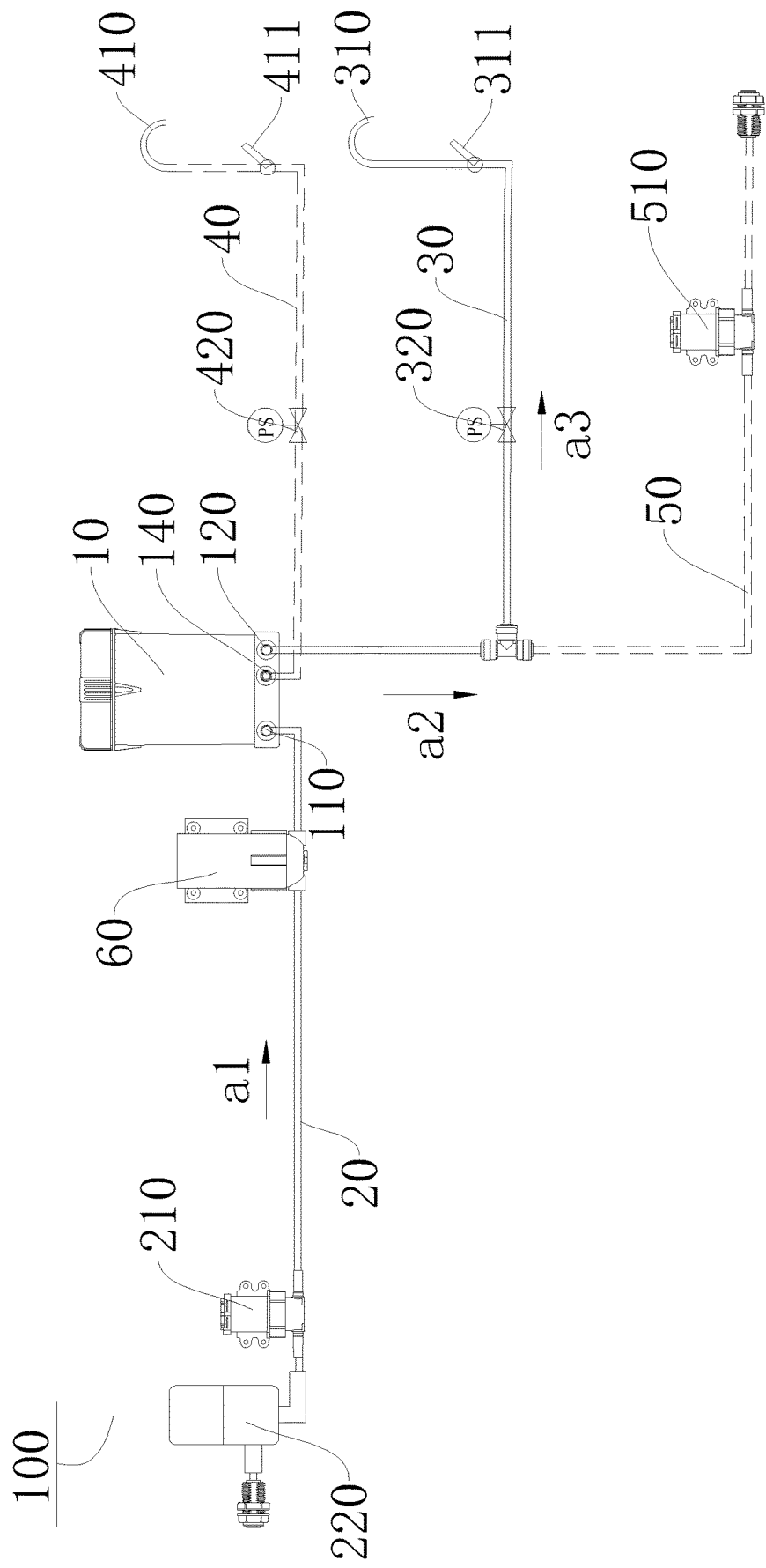
FIG. 1 is a schematic view of a water filtration system according to embodiments of the present disclosure, in which the water filtration system is in a work mode for production of pure water, dotted lines shown in the figure represent an off state, and a direction pointed by an arrow represents a direction that water flows in the water filtration system.

Water filtration system 100,
filter cartridge assembly 10, water inlet 110, purified-water outlet 120, pure-water outlet 140,
water-inlet conduit 20, water-inlet control valve 210, pre-filter mesh 220,
purified-water conduit 30, purified-water outer port 310, purified-water outer port switch 311, first valve body 320,
pure-water conduit 40, pure-water outer port 410, pure-water outer port switch 411, second valve body 420,
waste-discharge conduit 50, third valve body 510,
pump body assembly 60.

DETAILED DESCRIPTION

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the specification, it is to be understood that terms such as "upper," "lower," "front," "rear," "left," "right," "vertical," and "horizontal" should be construed to refer to the orientation as then described or as shown in the drawings under discussion. These relative terms are for convenience of description and do not require that the present invention be constructed or operated in a particular orientation. In addition, terms such as "first" and "second" are used herein for purposes of description and are not intended to indicate or imply relative importance or significance or to imply the number of indicated technical features. In the description of the present invention, the term "a plurality of" means two or more than two, unless specified otherwise.

A water filtration system 100 according to embodiments of the present disclosure will be described in the following with reference to FIG. 1 and FIG. 2.

Figure 2:
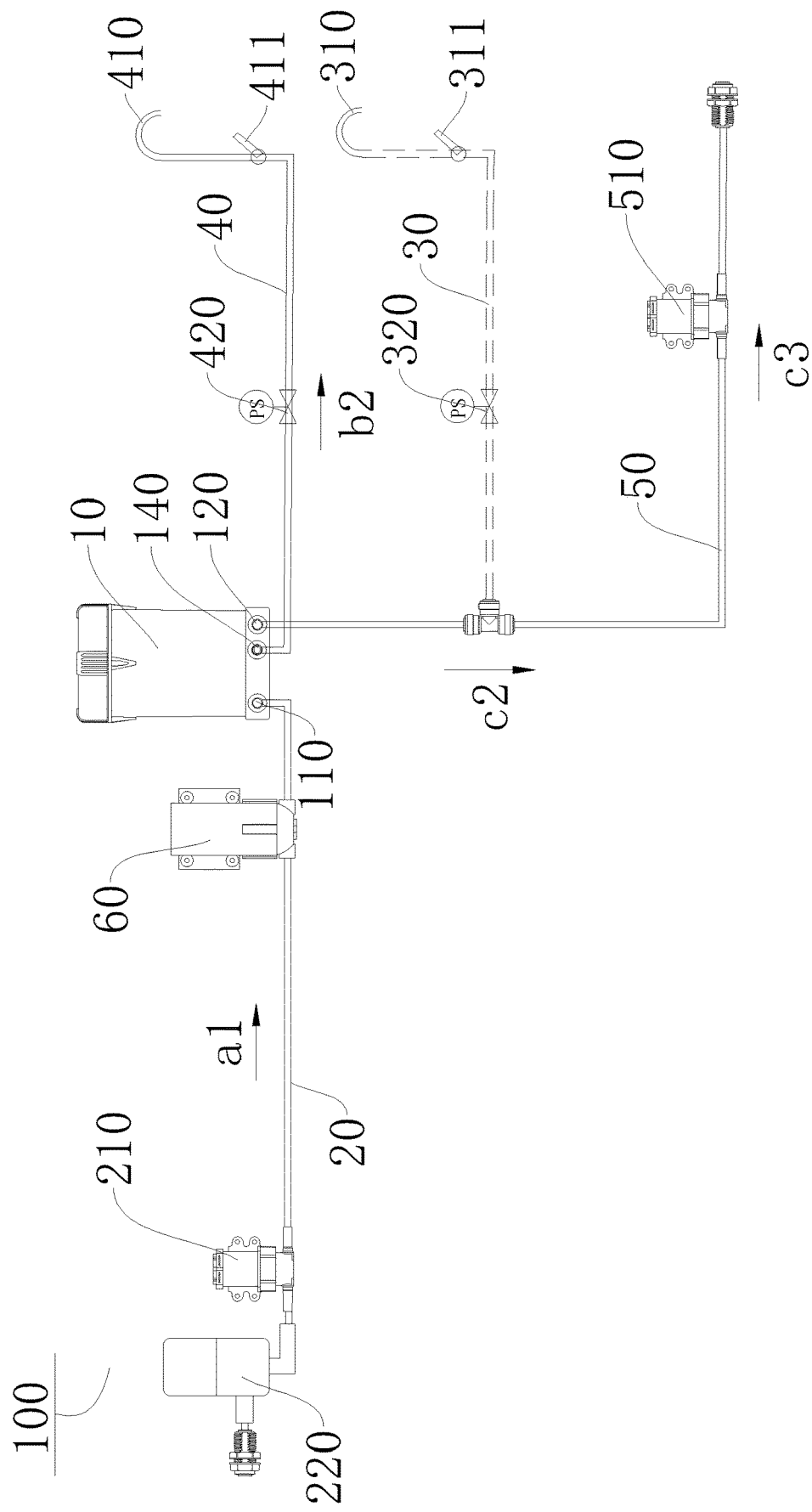
FIG. 2 is a schematic view of a water filtration system according to embodiments of the present disclosure, in which the water filtration system is in a work mode for production of pure water, dotted lines shown in the figure represent an off state, and a direction pointed by an arrow represents a direction that water flows in the water filtration system.

As shown in FIG. 1 and FIG. 2, the water filtration system 100 according to embodiments of the present disclosure includes a filter cartridge assembly 10, a water-inlet conduit 20, a pure-water conduit 40, a purified-water conduit 30 and a waste-discharge conduit 50.

Specifically, as shown in FIG. 1 and FIG. 2, the filter cartridge assembly 10 has a water inlet 110, a purified-water outlet 120 and a pure-water outlet 140. It should be noted that, the filter cartridge assembly 10 may be configured as an integrally composite filter cartridge. For example, the filter cartridge assembly 10 may include a pre-filter cartridge, a fine filter cartridge and a post-filter cartridge. The integrally composite filter cartridge can simplify the water filtration system 100, optimize a conduit layout and may implement a synchronous replacement of different filter cartridges, such that the use is convenient. The water-inlet conduit 20 is in communication with the water inlet 110 and is provided with a water-inlet control valve 210. Thus, by controlling the water-inlet control valve 210, raw water can be controlled to enter the water filtration system 100 through the water-inlet conduit 20. The "raw water" described herein may refer to water directly flowing out through a water faucet and may refer to well water, stored water and the like. For example, a filtering order of the raw water in the filter cartridge assembly 10 may be from the pre-filter cartridge to the fine filter cartridge and then to the post-filter cartridge.

The pure-water conduit 40 is in communication with the pure-water outlet 140. Pure water produced by the water filtration system 100 may flow out through the pure-water conduit 40. The purified-water conduit 30 is in communication with the purified-water outlet 120 and has a first valve body 320 configured to control on and off of the purified-water conduit 30. Thus, the on and off of the purified-water conduit 30 can be controlled by the first valve body 320. The waste-discharge conduit 50 is in communication with the purified-water conduit 30 and has a first end located between the first valve body 320 and the purified-water outlet 120. Thus, waste water generated during production of the pure water may be discharged out of the water filtration system 100 through the waste-discharge conduit 50.

When the water filtration system 100 produces the purified water, as shown in FIG. 1, the purified-water conduit 30 is turned on, the pure-water conduit 40 and the waste-discharge conduit 50 are out of communication (as shown by dotted conduits in FIG. 1). The water in the water filtration system 100 flows along a direction pointed by arrows a1→a2→a3. As shown by FIG. 1, the raw water passes through the water-inlet conduit 20 and enters the filter cartridge assembly 10 through the water inlet 110 to be preliminarily filtered, so as to produce the purified water. The purified water flows out of the filter cartridge assembly 10 through the purified-water outlet 120 and flows out through the purified-water conduit 30. Thus the purified water produced through the preliminary filtration may be used as domestic water for washing, watering flowers and showering.

When the water filtration system 100 produces the pure water, as shown in FIG. 2, the pure-water conduit 40 and the waste-discharge conduit 50 are turned on, the first valve body 320 is closed, the purified-water conduit 30 is out of communication (as shown by a dotted conduit in FIG. 2), and the pure-water conduit 40 is in communication, the waste-discharge conduit 50 is in communication. The water in the water filtration system 100 flows along a direction pointed by arrows a1→b2. As shown in FIG. 2, when the pure water is produced, the first valve body 320 on the purified-water conduit 30 is closed and a second valve body 420 on the second valve body 420 is opened. The raw water passes through the water-inlet conduit 20 and enters the filter cartridge assembly 10 through the water inlet 110 to be finely filtered, so as to produce the pure water. The pure water obtained through the fine filtration flows out through the pure-water outlet 140 and flows out through the pure-water conduit 40. Thus, the pure water obtained through the fine filtration can be drunk directly.

It should be noted that, the waste water is generated in the process of producing the pure water, and the waste water may be discharged out through the purified-water outlet 120 and discharged out of the water filtration system 100 through the waste-discharge conduit 50 (such as in a direction shown by arrows c2→c3 in FIG. 2) after being.

For the water filtration system 100 according to embodiments of the present disclosure, by disposing the filter cartridge assembly 10, a structure of the water filtration system 100 can be made compact and a conduit layout may be optimized. Moreover, the purified-water conduit 30 and the pure-water conduit 40 are separately disposed in the water filtration system 100, such that outlets of water of different qualities may be selected according to different water requirements in lives, the operation is easy, waste may be reduced, energy is saved and consumption is reduced. In addition, the waste-discharge conduit 50 is in communication with the purified-water conduit 30, thus making the waste-discharge conduit 50 and the purified-water conduit 30 share the purified-water outlet 120, thereby reducing orifices in the water filtration system 100, and further optimizing the conduit layout.

According to some embodiments of the present disclosure, as shown in FIG. 1 and FIG. 2, the water filtration system 100 may further include: a pump body assembly 60 and the second valve body 420. In which, the pump body assembly 60 is arranged on the water-inlet conduit 20, so as to drive the water in the water-inlet conduit 20 to flow. Thus, the water pressure can be increased by the pump body assembly 60, which is beneficial to improvement of the filtration efficiency of the water filtration system 100. It should be noted that, when the water needs to be finely filtered, the water needs a certain pressure, by disposing the pump body assembly 60 on the water-inlet conduit 20, pressure on the water can be increased, such that the water can flow into the filter cartridge assembly 10 to be finely filtered. As shown in FIG. 1 and FIG. 2, the pure-water conduit 40 is provided with the second valve body 420. Thus, the pure-water conduit 40 may be in communication or out of communication by controlling the second valve body 420.

Alternatively, the pump body assembly 60 is located between the water-inlet control valve 210 and the water inlet 110. Thus, on and off of the water route may be controlled promptly by controlling the water-inlet control valve 210. It could be understood that, when the water-inlet control valve 210 is closed, the raw water can be stopped from entering the pump body assembly 60 and the filter cartridge assembly 10; and when the water-inlet control valve 210 is opened, the raw water can enter the pump body assembly 60 and the filter cartridge assembly 10 through the water-inlet conduit 20. By disposing the pump body assembly 60 between the water-inlet control valve 210 and the water inlet 110, it may prevent a faulty operation from causing damage to the water filtration system 100. For example, if the water-inlet control valve 210 is disposed at the downstream of the pump body assembly 60, when the water-inlet control valve 210 is closed while the pump body assembly 60 is not closed, the water after being pressurized by the pump body assembly 60 tends to result in a cracking of the conduit and damage the water filtration system 100. The "downstream" described herein may refer to the downstream which is understood through the flowing direction pointed by arrows in FIG. 1 and FIG. 2.

Furthermore, the pump body assembly 60 may be configured as a booster pump. Thus, the booster pump can provide the water with sufficient pressure, so as to make the water run through the filter cartridge assembly 10 to be finely filtered. In some embodiments of the present disclosure, as shown in FIG. 1 and FIG. 2, the first valve body 320 and the second valve body 420 may be configured as check valves. It should be noted that, the first valve body 320 and the second valve body 420 may control the water filtration system 100 in a feedback manner by adopting check-valve high pressure switches. As shown in FIG. 1 and FIG. 2, an end portion of the pure-water conduit 40 is provided with a pure-water outer port 410, and the pure-water outer port 410 may be provided with a pure-water outer port switch 411; an end portion of the purified-water conduit 30 may be provided with a purified-water outer port 310, and the purified-water outer port 310 may be provided with a purified-water outer port switch 311. The first valve body 320 and the second valve body 420 may be configured as the check-valve high pressure switches, the check-valve high pressure switches may detect changes of pressure at the downstream of the check valve and feedback the signals of pressure change to the system, the system may adjust the close and open state of the water-inlet control valve 210 and the on and off pump body assembly 60 according to the feedback signals.

As shown in FIG. 2, when the purified-water outer port switch 311 is switched off and the pure-water outer port switch 411 is switched on, the second valve body 420 may detect that the water pressure at the downstream of the pure-water conduit 40 is reduced and transmit the signals of reduced water pressure to the system. The system controls the water-inlet control valve 210 and the pump body assembly 60 to operate. In this case the raw water may flow into the water filtration system 100 through the water-inlet conduit 20 and is pressurized by the pump body assembly 60. The pressurized water is preliminarily filtered and finely filtered through the filter cartridge assembly 10, and the obtained pure water flows to the pure-water conduit 40 through the pure-water outlet 140 and eventually flows out through the pure-water outer port 410.

As shown in FIG. 1, when the purified-water outer port switch 311 is switched on, the first valve body 320 detects that the water pressure at the downstream of the purified-water conduit 30 is reduced and transmits the signals of reduced water pressure to the system. The system turns off the pump body assembly 60 according to the signals of reduced water pressure. In this case, the water entering the water filtration system 100 through the water-inlet conduit 20 has a low pressure, because the water cannot be pressurized by the pump body assembly 60. In this case, pressure of the water cannot reach the pressure required for the fine filtration, the water only flows to the filter cartridge assembly 10 to be preliminarily filtered. The purified water is obtained after preliminary filtration and flows into the purified-water conduit 30 through a purified water outlet, and eventually flows out through the purified-water outer port 310. It is worth understanding that, when the purified-water outer port switch 311 is switched on, the system controls the pump body assembly 60 to be turned off. The pressure of the water in the water filtration system 100 is too low, the water cannot be finely filtered. Accordingly, the pure water is not produced in this case, the pure-water conduit 40 and the waste-discharge conduit 50 are both in off states (such as the dotted conduits shown in FIG. 1).

Alternatively, the water-inlet control valve 210 is configured as a solenoid valve. By disposing the water-inlet control valve 210 to be the solenoid valve, on one hand, the solenoid valve is operationally accurate and reliable, and is beneficial to improvement of the operational reliability and stability of the water filtration system 100; on the other hand, compared with a manual valve the solenoid valve does not need the physical labor when the water-inlet control valve 210 is opened and closed, thus facilitating improvement of the overall performance of the water filtration system 100.

In some embodiments of the present disclosure, as shown in FIG. 1 and FIG. 2, the water filtration system 100 may also include a pre-filter mesh 220, the pre-filter mesh 220 is provided on the water-inlet conduit 20 and located at the upstream of the water-inlet control valve 210. The "upstream" described herein refers to the upstream which is understood in the flowing direction pointed by arrows in FIG. 1 and FIG. 2. Thus, by disposing the pre-filter mesh 220 at the upstream of the water-inlet conduit 20, large-grain impurities in the water may be filtered out when the water passes through the pre-filter mesh 220, to prevent the large-grain impurities from entering the water-inlet control valve 210 and the pump body assembly 60 to cause damage to the water-inlet control valve 210 and the pump body assembly 60, thereby prolonging the service life of the water-inlet control valve 210 and the pump body assembly 60.

According to some embodiments of the present disclosure, the waste-discharge conduit 50 is provided with a third valve body 510 configured to control on and off of the waste-discharge conduit 50. Thus, by disposing the third valve body 510, the waste-discharge conduit 50 may be turned on or off, and flow of the waste water may be adjusted. It should be noted that, the flow of the waste water may be adjusted by the third valve body 510. For example, when the flow of the waste water is reduced by controlling the third valve body 510, the water may have the sufficient pressure to be finely filtered. And when the flow of the waste water is increased by controlling the third valve body 510, and the pure-water outer port switch 411 and the purified-water outer port switch 311 are switched off, in this case, as shown in FIG. 2, the water in the water filtration system 100 may flow in the direction pointed by arrows a1→c2→c3. It should be noted that, in the process of the fine filtration, impurities may be accumulated at the fine filter cartridge, and after a long-time service, there will be lots of impurities accumulated at the fine filter cartridge. Thus, by increasing the flow of the waste-discharge conduit 50 and switching off the pure-water outer port switch 411 and the purified-water outer port switch 311, the fine filter cartridge may be washed and cleaned, thereby protecting the fine filter cartridge and prolonging the service life of the fine filter cartridge.

Furthermore, the third valve body 510 is configured as a solenoid valve. Thus, the third valve body 510 can be easily and accurately opened and closed. It should be noted that, when the purified water and the pure water are normally produced, the third valve body 510 may be turned off. When the third valve body 510 is turned off, the third valve body 510 defines a through hole of small flow, on one hand, to maintain the pressure required by the water filtration system 100 when the water filtration system 100 produces the pure water, and on the other hand, to discharge the waste water generated during production of the pure water. When the fine filter cartridge needs to be cleaned, the third valve body 510 may be energized, such that the third valve body 510 is in an open state, in this case, by switching off the pure-water outer port switch 411 and the purified-water outer port switch 311, the flow of the waste water can be increased, which may increase the flux of the waste water, so as to wash and clean the fine filter cartridge.

In some embodiments of the present disclosure, the filter cartridge assembly 10 may include the pre-filter cartridge, the fine filter cartridge and the post-filter cartridge. In which, the pre-filter cartridge is located between the water inlet 110 and the purified-water outlet 120, the pre-filter cartridge may filter out the large-grain impurities in the raw water to obtain the purified water. The purified water may be used as the domestic water for washing, watering the flowers and the like. The fine filter cartridge is located between the pure-water outlet 140 and the purified-water outlet 120, and may further filter the purified water and filter out minor impurities in the water, for example, excessive harmful substances such as inorganic salts, organic matters, heavy mental ions, bacterium, viruses, pesticides, trichloromethane wastes and the like all may be trapped, and these harmful foreign matters and salts in the water may be discharged by the continuously discharging waste water, thereby improving the water quality. The post-filter cartridge is further disposed to the pure-water outlet 140, and the water through the fine filter cartridge is further filtered by the post-filter cartridge. For example, the post-filter cartridge may adopt activated carbon, and on one hand, the activated carbon may absorb pigments and odors in the water by a large amount of fiber gaps therein, on the other hand fruity odors may be added to the activated carbon, such that the pure water flowing out through the post-filter cartridge is clean and safe and its mouthfeel is improved.

Furthermore, the fine filter cartridge may be a reverse-osmosis filter cartridge or a nanofiltration-membrane filter cartridge. That is to say, the fine filter cartridge may be the reverse-osmosis filter cartridge, and may also be the nanofiltration-membrane filter cartridge. It should be noted that, the reverse-osmosis filter cartridge has tiny apertures, and the apertures may reach a millionth of a diameter of a human hair (0.0001 micrometer), and only a water molecule and some mineral ions can pass through it, such that the impurities, bacterium and viruses in the water may be filtered out effectively. However, the water has a character of flowing from an area of low concentration to an area of high concentration without an action of external forces. Thus, a sufficient pressure needs to be exerted on the water, to ensure that the water passes through the reverse-osmosis filter cartridge to be finely filtered. While an aperture in the nanofiltration-membrane filter cartridge is about a few nanometers, and nanofiltration is a pressure-driven membrane separation process between reverse osmosis and ultrafiltration, such that the nanofiltration-membrane filter cartridge may reduce the requirements for water pressure in the fine filtration process in the water filtration system 100, thereby saving the energy consumption.

It could be understood that, the water-inlet conduit 20 may not be provided with the pump body assembly 60, the water-inlet control valve 210 may be configured as a manual water-inlet control valve, the third valve body 510 on the waste-discharge conduit 50 is configured as a manual third valve body, and the purified-water outer port switch 311 is configured as a purified-water manual valve, the pure-water outer port switch 411 is alternatively configured as a pure-water manual valve, such that in use of the water filtration system 100, electric equipment such as a pump is needless, and it's just need to manually open and close the manual water-inlet control valve, the manual third valve body, the purified-water manual valve or the purified-water manual valve, thereby saving power and reducing cost.

For example, when the purified water is needed, the manual water-inlet control valve and the purified-water manual valve may be opened, and the pure-water manual valve may be kept closed, the raw water is filtered by the filter cartridge assembly 10 and flows out through the purified-water outlet 120, passes through the purified-water conduit 30 and flows out through the purified-water outer port 310 for the users to use. In this case, there is basically no waste water to be generated, and the manual third valve body may be kept closed. When the pure water is needed, the manual water-inlet control valve, the pure-water manual valve and the manual third valve body may be opened, the purified-water manual valve may be closed, the raw water may permeate into the fine filter cartridge under its own pressure to be filtered and flows out of the filter cartridge assembly 10 through the pure-water outlet 140, passes through the pure-water conduit 40 and eventually flows out through the pure-water outer port 410. The waste water flows out through the waste-discharge conduit 50.

The water filtration system 100 according to embodiments of the present disclosure is described in detail based on two specific embodiments in the following with reference to FIG. 1 and FIG. 2. It's worth understanding that, the following description is just explanatory and shall not be construed as a limit to the present disclosure.

Embodiment One

As shown in FIG. 1 and FIG. 2, the water filtration system 100 includes: the filter cartridge assembly 10, the water-inlet conduit 20, the pure-water conduit 40, the purified-water conduit 30 and the waste-discharge conduit 50.

As shown in FIG. 1 and FIG. 2, the filter cartridge assembly 10 includes the water inlet 110, the purified-water outlet 120 and the pure-water outlet 140. The filter cartridge assembly 10 is an integrally composite filter cartridge, and the filter cartridge assembly 10 includes: the pre-filter cartridge, the fine filter cartridge and the post-filter cartridge. The pre-filter cartridge is located between the water inlet 110 and the purified-water outlet 120. The fine filter cartridge is a reverse-osmosis filter cartridge and located between the pure-water outlet 140 and the purified-water outlet 120. The post-filter cartridge is disposed at the pure-water outlet 140.

The water-inlet conduit 20 is in communication with the water inlet 110, and the water-inlet conduit 20 is provided with the pre-filter mesh 220, the water-inlet control valve 210, and the pump body assembly 60. The water-inlet control valve 210 is the solenoid valve and the pump body assembly 60 is the booster pump. The pre-filter mesh 220 is located at the upstream of the water-inlet control valve 210 and the pump body assembly 60. The purified-water conduit 30 is in communication with the purified-water outlet 120 and provided with the first valve body 320. The end portion of the purified-water conduit 30 is provided with the purified-water outer port 310 and the purified-water outer port switch 311. The pure-water conduit 40 is in communication with the pure-water outlet 140 and provided with the second valve body 420. The end portion of the pure-water conduit 40 is provided with the pure-water outer port 410 and the pure-water outer port switch 411. The first valve body 320 and the second valve body 420 are check valves. An upstream connection end of the waste-discharge conduit 50 is connected between the first valve body 320 and the purified-water outlet 120.

As shown in FIG. 1, when the water filtration system 100 produces the purified water, the purified-water outer port switch 311 is switched on, the purified-water conduit 30 is in partial communication state, the second valve body 420 detects that the water pressure at the downstream of the purified-water conduit 30 is reduced and transmits the signals of reduced water pressure to the system. The system turns off the pump body assembly 60 according to the signals of reduced water pressure. In this case, as shown in FIG. 1, the pure-water conduit 40 and the waste-discharge conduit 50 are both out of communication (as shown in FIG. 1, the pure-water conduit 40 and the waste-discharge conduit 50 are shown by the dotted lines), the water flows along the direction pointed by arrows a1→a2→a3 in FIG. 1 in the water filtration system 100. As shown in FIG. 1, when the raw water enters the water-inlet conduit 20, firstly the large-grain impurities in the water may be filtered out by the pre-filter mesh 220, thus preventing the large-grain impurities from causing damage to the water-inlet control valve 210 and the pump body assembly 60. The water passes through the water inlet 110, enters the filter cartridge assembly 10 through the water-inlet conduit 20, and is preliminarily filtered by the pre-filter cartridge to obtain the purified water. The purified water flows out of the filter cartridge assembly 10 through the purified-water outlet 120 and flows out through the purified-water outer port 310. Thus, the obtained purified water may be used as the domestic water for washing and watering the flowers.

When the water filtration system 100 produces the pure water, as shown in FIG. 2, the purified-water outer port switch 311 is switched off, the purified-water conduit 30 is out of communication (as shown in FIG. 2, the purified-water conduit 30 is shown by the dotted line), and the pure-water outer port switch 411 is switched on. When the pure-water outer port switch 411 is switched on, the second valve body 420 detects that the water pressure at the downstream of the pure-water conduit 40 is reduced and transmits the signals of reduced water pressure to the system. The system opens the first valve body 320 and turns on the pump body assembly 60, and communication in the pure-water conduit 40 and communication in the waste-discharge conduit 50 are available. The water flows in the water filtration system 100 along the direction shown by arrows a1→b2.

As shown in FIG. 2, when the water filtration system produces the pure water, the large-grain impurities in the raw water are filtered out through the pre-filter mesh 220 of the water-inlet conduit 20. The filtered water passes through the water-inlet control valve 210 and the pump body assembly 60 and enters the filter cartridge assembly 10 through the water inlet 110. In which, the pump body assembly 60 may pressurize the water and the pressurized water passes through the fine filter cartridge in the filter cartridge assembly 10 to be further filtered and is filtered again by the post-filter cartridge to further improve the water quality and the mouthfeel, eventually the obtained pure water flows out through the pure-water outlet 140 and flows out through the pure-water conduit 40. Thus, the obtained pure water may be used as drinking water or used for cooking.

It should be noted that, the waste water is generated in the process of producing the pure water. The waste water is discharged through the purified-water outlet 120 and discharged out of the water filtration system 100 through the waste-discharge conduit 50 (such as the flowing direction pointed by arrows c2→c3 in FIG. 2).

Thus, by disposing the filter cartridge assembly 10, the structure of the water filtration system 100 is compact and the conduit layout is optimized. Moreover, the purified-water conduit 30 and the pure-water conduit 40 are separately disposed in the water filtration system 100, such that outlets outputting water of different quality may be selected according to different water requirements in lives, the operation is easy, waste may be reduced, energy is saved and consumption is reduced. In addition, the waste-discharge conduit 50 is in communication with the purified-water conduit 30, thus making the waste-discharge conduit 50 and the purified-water conduit 30 share the purified-water outlet 120, thereby reducing ports in the water filtration system 100, further optimizing the conduit layout.

Embodiment Two

A difference from the embodiment one is that, in the present embodiment, the water-inlet control valve 210 on the water-inlet conduit 20 is configured as the manual water-inlet control valve, and the pump body assembly 60 is cancelled. The third valve body 510 on the waste-discharge conduit 50 is configured as the manual third valve body and the purified-water outer port switch 311 is the purified-water manual valve, the pure-water outer port switch 411 is alternatively configured as the pure-water manual valve.

When the purified water is needed, the manual water-inlet control valve and the purified-water manual valve may be opened, and the purified-water manual valve may be kept in the closed state, the raw water is filtered by the filter cartridge assembly 10 and flows out through the purified-water outlet 120, passes through the purified-water conduit 30 and flows out through the purified-water outer port 310 for the user to use, in this case, there is basically no waste water to be generated, and the manual third valve body may be kept in the closed state. When the pure water is needed, the manual water-inlet control valve, the purified-water manual valve and the manual third valve body may be opened, the purified-water manual valve may be kept in the closed state, the raw water may permeate into the fine filter cartridge under its own pressure to be filtered and flow out the filter cartridge assembly 10 through the pure-water outlet 140, and eventually flows out through the pure-water outer port 410 through the pure-water conduit 40. The waste water flows out through the waste-discharge conduit 50. Thereby saving power and reducing cost.

Thus, in use of the water filtration system 100, electric equipment such as a pump can be cancelled, and only the manual water-inlet control valve, the manual third valve body, the purified-water manual valve and the purified-water manual valve are needed to be controlled manually, thereby saving power and reducing cost.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A water filtration system, comprising:
    an integrally composite filter cartridge assembly, defining a water inlet, a purified-water outlet and a pure-water outlet on an outer surface thereof, wherein the integrally composite filter cartridge assembly is configured to process raw water received through the water inlet to selectively produce purified water through a first filtration flow path, and to produce pure water and waste water through a second filtration flow path that is different from the first filtration flow path;
    a water-inlet conduit, in communication with the water inlet and provided with a water-inlet control valve;
    a pure-water conduit, in communication with the pure-water outlet;
    a purified-water conduit, in communication with the purified-water outlet and having a first valve body configured to control on and off of the purified-water conduit; and
    a waste-discharge conduit, in communication with the purified-water conduit and having an end located between the first valve body and the purified-water outlet;
    wherein when the water filtration system produces purified water, the purified-water conduit is open to allow purified water to flow from the purified-water outlet into the purified-water conduit, and wherein when the water filtration system produces pure water, the pure-water conduit is open to allow pure water to flow from the pure-water outlet into the pure-water conduit, the waste-discharge conduit is open to allow waste water produced with the pure water to flow from the purified-water outlet to the end of the waste-discharge conduit and through the waste-discharge conduit, and the first valve body is closed.

2. The water filtration system according to claim 1, further comprising:
    a pump body assembly provided on the water-inlet conduit, configured to drive water in the water-inlet conduit to flow; and
    a second valve body located on the pure-water conduit.

3. The water filtration system according to claim 2, wherein the pump body assembly is located between the water-inlet control valve and the water inlet.

4. The water filtration system according to claim 2, wherein the pump body assembly is configured as a booster pump and the second valve body is configured as a check valve.

5. The water filtration system according to claim 1, wherein the water-inlet control valve is configured as a solenoid valve.

6. The water filtration system according to claim 1, further comprising:

a pre-filter mesh provided on the water-inlet conduit and located at upstream of the water-inlet control valve.

7. The water filtration system according to claim 1, wherein the waste-discharge conduit is provided with a second valve body configured to control on and off of the waste-discharge conduit.

8. The water filtration system according to claim 7, wherein the third valve body is configured as a solenoid valve.

* * * * *